US011344852B1

(12) United States Patent
Hamler et al.

(10) Patent No.: US 11,344,852 B1
(45) Date of Patent: May 31, 2022

(54) HYDROPONIC SYSTEM AND METHOD FOR ENRICHING A LIQUID WITH GAS-BUBBLES

(71) Applicant: Enrichment Systems LLC, Boulder, CO (US)

(72) Inventors: Jerome Charles Hamler, Phoenix, AZ (US); Jacob Henry Elliott, Lafaytte, CO (US); Rex O'Neal, Lafayette, CO (US); Jack Sweeten, Denver, CO (US)

(73) Assignee: ENRICHMENT SYSTEMS LLC, Boulder, CO (US)

( * ) Notice: Subject to any disclaimer, the term of this patent is extended or adjusted under 35 U.S.C. 154(b) by 0 days.

(21) Appl. No.: 17/348,707

(22) Filed: Jun. 15, 2021

(51) Int. Cl.
*B01F 3/04* (2006.01)
*B01F 23/232* (2022.01)
(Continued)

(52) U.S. Cl.
CPC .......... *B01F 23/2323* (2022.01); *B01F 23/29* (2022.01); *B01F 25/3131* (2022.01);
(Continued)

(58) Field of Classification Search
CPC .............. B01F 3/04503; B01F 3/04985; B01F 5/0451; B01F 15/0243; B01F 2003/04858;
(Continued)

(56) References Cited

U.S. PATENT DOCUMENTS

| 4,194,891 A | 3/1980 | Earls et al. |
| 4,194,892 A | 3/1980 | Jones et al. |

(Continued)

FOREIGN PATENT DOCUMENTS

| EP | 3124109 A1 | 2/2017 |
| JP | 2011218308 A | 11/2011 |

(Continued)

OTHER PUBLICATIONS

Beaver Lake Ecology, "Technical Report II Review of Beaver Lake Ecology and the Need for Aeration as an Immediate PriorityCRD, Parks and Environmental Services" Aug. 2018, 13 pages.

(Continued)

*Primary Examiner* — Charles S Bushey
(74) *Attorney, Agent, or Firm* — Stephen B. Katsaros; Patent Engineering, LLC

(57) ABSTRACT

In one configuration, a hydroponic system for enriching a liquid with gas-bubbles is disclosed. The system may include at least one reservoir configured to temporarily store the gas-bubble enriched liquid. Each of the at least one reservoir may include an associated inlet port and an associated outlet port fluidically coupled with each other via a liquid-flow line. The system includes one or more pumps configured to cause movement of the liquid along the liquid-flow line, a gas supply feeding a gas (in one configuration, oxygen from a gas concentrator), and a gas-bubble generator provided on the liquid-flow line. The gas-bubble generator may be fluidically coupled to the gas supply to receive gas from the gas supply. The gas-bubble generator may be configured to generate a plurality of individual gas-bubbles of the gas received from the gas supply and mix with the liquid stream flowing via the gas-bubble generator.

26 Claims, 9 Drawing Sheets

(51) Int. Cl.
B01F 23/20 (2022.01)
B01F 25/313 (2022.01)
B01F 35/71 (2022.01)
B01F 23/2373 (2022.01)
B01F 23/237 (2022.01)
B01F 25/00 (2022.01)

(52) U.S. Cl.
CPC ...... *B01F 35/7176* (2022.01); *B01F 23/2373* (2022.01); *B01F 23/237612* (2022.01); *B01F 2025/916* (2022.01)

(58) Field of Classification Search
CPC .......... B01F 2003/04879; B01F 5/0206; B01F 5/0413; B01F 23/2323; B01F 23/29; B01F 23/2373; B01F 23/237612; B01F 25/3131; B01F 35/7176; B01F 2005/0025; B01F 2025/916
USPC .............................. 261/29, 36.1, 76, 77, 79.2
See application file for complete search history.

(56) References Cited

U.S. PATENT DOCUMENTS

| | | | | |
|---|---|---|---|---|
| 4,561,287 | A | * | 12/1985 | Rowland ............... A61M 16/10 128/202.26 |
| 4,749,527 | A | | 6/1988 | Rasmusen |
| 5,213,773 | A | * | 5/1993 | Burris ...................... A61L 2/202 210/138 |
| 5,561,944 | A | | 10/1996 | Ismail et al. |
| 5,772,731 | A | * | 6/1998 | Harrison ................ C12M 41/26 95/8 |
| 5,816,498 | A | * | 10/1998 | Smith, Jr. ................. A01G 7/06 239/172 |
| 5,858,069 | A | * | 1/1999 | Harrison ................... C02F 3/26 95/154 |
| 7,255,332 | B2 | | 8/2007 | Osborn et al. |
| 8,678,354 | B2 | | 3/2014 | Kerfoot |
| 8,980,091 | B2 | | 3/2015 | Fabiyi |
| 9,034,195 | B2 | | 5/2015 | Wood |
| 9,061,255 | B2 | | 6/2015 | Song et al. |
| 9,527,046 | B1 | | 12/2016 | Roe |
| 9,541,539 | B2 | | 1/2017 | Machuca et al. |
| 9,764,254 | B2 | | 9/2017 | Kobayashi et al. |
| 10,052,596 | B2 | | 8/2018 | Richardson |
| 10,125,359 | B2 | | 11/2018 | Watson et al. |
| 10,219,670 | B2 | | 3/2019 | Citsay |
| 10,598,447 | B2 | | 3/2020 | Russell et al. |
| 10,814,290 | B2 | | 10/2020 | Bauer |
| 10,953,375 | B2 | | 3/2021 | Blevins et al. |
| 2007/0069403 | A1 | * | 3/2007 | Schletz ............... B03D 1/1412 261/76 |
| 2007/0257381 | A1 | * | 11/2007 | Chuang .................... B01F 5/12 261/76 |
| 2008/0202995 | A1 | | 8/2008 | Senkiw |
| 2009/0306440 | A1 | * | 12/2009 | Aasen ................. B01F 3/04503 585/1 |
| 2009/0321370 | A1 | * | 12/2009 | Nelson .................... C01B 13/10 210/760 |
| 2015/0314248 | A1 | * | 11/2015 | Castellote ........... A61H 33/027 261/29 |
| 2018/0296991 | A1 | | 10/2018 | Park |
| 2020/0045943 | A1 | * | 2/2020 | Amiry-Moghaddam .................... A01K 63/042 |
| 2020/0139068 | A1 | * | 5/2020 | Sato ........................ G16H 40/63 |
| 2020/0261865 | A1 | * | 8/2020 | MacPhee ............ B01F 3/04503 |
| 2021/0001273 | A1 | | 1/2021 | Earthman et al. |

FOREIGN PATENT DOCUMENTS

| | | |
|---|---|---|
| JP | 2012236151 A | 12/2012 |
| KR | 101902337 B1 | 11/2018 |

OTHER PUBLICATIONS

Ingildsen, et al, "Dissolved oxygen controller based on on-line measurements of ammonium combining feed-forward and feed-back", Water Science Technology, vol. 45 No. 4, 2002, pp. 453-460.

Khan, et al., "Micro-nanobubble technology and water-related application" Water Supply (2020) 20 (6): pp. 2021-2035.

Kosuke, et al., "Oxygen and Air Nanobubble Water Solution Promote the Growth of Plants, Fishes, and Mice", Plos ONE, vol. 8, Issue 6, Jun. 2013, 7 pages.

Manning, "On the thermodynamic stability of bubbles, immiscible droplets, and cavities", Phys. Chem. Chem. Phys., 2020, 22, pp. 17523-17531.

Moleaer Inc., "Moleaer's Nanobubble Solution at Big Tex Urban Farms", YouTube video dated Sep. 26, 2018, download Jun. 22, 2021,URL https://www.youtube.com/watch?v=qonQFHPVqiU, 6 pages.

Ozonetech, "Oxygen generators and concentrators for a wide range of industrial applications" retrieved from Internet Jun. 22, 2021 from URL https://www.ozonetech.com/products/oxygen-generators-concentrators/, pp. 9-30.

Shu Liu, et al., "Oxidative Capacity of Nanobubbles and Its Effect on Seed 2 Germination", ACS Sustainable Chemistry & Engineering, Dec. 2015, 7 pages.

Shu Liu, et al., "Stimulating effect of nanobubbles on the reactive oxygen species generation inside barley seeds as studied by themicroscope spectrophotometer", International Conference of Agricultural Engineering, Jul. 6, 2014, 8 pages.

Zhou, et al., "Synergistic improvement in spring maize yield and quality with micro/nanobubbles water oxygation", Scientific Reports, Mar. 26, 2019, 11 pages.

* cited by examiner

HYDROPONIC SYSTEM AND METHOD FOR ENRICHING A LIQUID WITH GAS-BUBBLES

TECHNICAL FIELD

This disclosure relates in general to a hydroponic system for enriching a liquid with gas bubbles (e.g. oxygen from a gas concentrator), and particularly to a system, an apparatus, and a method of enriching a liquid with gas-bubbles for increasing the yield of plants.

BACKGROUND

Plants are multicellular organisms, predominantly photosynthetic eukaryotes of the kingdom Plantae. They obtain most of their energy from sunlight via photosynthesis by primary chloroplasts that are derived from endosymbiosis with cyanobacteria. Their chloroplasts contain chlorophylls a and b, which give them their green color. Some plants are parasitic or mycotrophic and have lost the ability to produce normal amounts of chlorophyll or to photosynthesize, but still have flowers, fruits, and seeds. Plants are characterized by sexual reproduction and alternation of generations, although asexual reproduction is also common.

The term "plant" generally implies the possession of the following traits: multicellularity, possession of cell walls containing cellulose, and the ability to carry out photosynthesis with primary chloroplasts. While there are about 320,000 species of plants, of which the great majority, some 260-290 thousand, produce seeds. Green plants provide a substantial proportion of the world's molecular oxygen and are the basis of most of Earth's ecosystems. Plants that produce grain, fruit, and vegetables also form basic human foods and have been domesticated for millennia. Plants have many cultural and other uses, as ornaments, building materials, writing materials and, in great variety, they have been the source of medicines and psychoactive drugs (e.g. cannabis). Specifically, the term "cannabis" as an umbrella term for hemp, marijuana, or any extracts of hemp/marijuana, such as CBD or THC.

Plants can be grown outdoors or indoors. When grown indoors, a soil-like medium receives seeds or actively growing plants placed under artificial light while adding liquid (typically water). Cultivating plants indoors is more complicated and expensive than growing outdoors, but it allows the cultivator complete control over the growing environment. Plants of any type can be grown faster indoors than out due to 24-hour light, additional atmospheric CO2, controlled saturation and/or humidity which allows freer CO2 respiration that culminates in plant growth.

Plants can also be grown indoors with hydroponics wherein a growing medium (e.g. soil or growing substrate), water, nutrients, and light are supplied to the plant. If the nutrient solution floods the loose growing medium and recedes for aeration, this is an ebb and flow or flood and drain system. Enrichment of liquids has been difficult to scale-up because they are crude and/or artisanal resulting in complications with unpredictable results.

SUMMARY

Every production system benefits from efficiency gains. This holds true when the production system is a plant. Even small efficiency gains can convert a hydroponic system from being unprofitable, unreliable, and unscalable into a profitable, robust, and limitless hydroponic system. This is especially true when growing challenging plants (e.g. orchids, melons, wasabi, cannabis, celery, etc.). Challenging plants often thrive when their roots are suspended in a liquid infused with at least one gas (e.g. oxygen). A system for infusing ideal oxygen-bearing gasses has been desired, but until now elusive.

Coordinating the economics, mechanics, and practicality of constantly (or intermittently) applying liquid infused with gas-bubbles has been difficult. The gas-bubble infused liquid is pumped into growing medium (e.g. gravel, sand, wood chips, sawdust, perlite and Rock Wool) in which the crop is planted. In some applications, liquid flow is terminated, and the liquid quickly drains to allow the roots to breathe (the roots release CO2 and absorb oxygen). Then the irrigation is repeated and drained away again, basically emulating nature but very quickly. This basic hydroponic method is exceptionally reliable, especially when operated in steady state with the present hydroponic system and method for enriching a liquid with gas-bubbles.

The present hydroponic system and method positively affects the growth and health of many plant species (e.g., lettuce, tomatoes, beans, citrus fruits, orchids, melons, wasabi, cannabis, celery, etc.). For example, it has been observed that providing cannabis plants with 20 parts per million (PPM) or greater of oxygen bubbles in the water reduces cultivation time, increases production volume, and improves plant health. It is interesting to note that tap water may have only 0 to 4 PPM of dissolved oxygen. It is also well accepted that gas-bubbles in the liquid increase root porosity making it easier for plants to absorb water. Further, gas-bubbles may be a transport mechanism from the outside to the inside of the root. Moreover, gas bubbles may implode producing thereby OH radicals that may be beneficial for the plants. It has been difficult to generate the gas-bubbles. Prior aeration methods are unable to generate gas-bubbles that are small enough in size to stay in solution; therefore, the gas-bubbles concentration levels are inconsistent and unsustainable. The present disclosure addresses these and other realities of creating, transporting, and maintaining gas-bubbles in liquid as, for example, follows:

A hydroponic system for enriching a liquid with gas-bubbles is provided in accordance with a configuration of the present disclosure. The hydroponic system may include a first reservoir configured to temporarily store the liquid. The first reservoir may include an inlet port, an outlet port, and a liquid-flow line that is fluidically coupled to the inlet port and the outlet port. The liquid may enter the first reservoir via the inlet port, while the liquid may exit the first reservoir via the outlet port. The hydroponic system may further include a pump that is configured to cause movement of the liquid along the liquid-flow line. The pump may include a suction port and a discharge port. The hydroponic system may include a gas supply feeding a gas. The hydroponic system may further include a gas-bubble generator that may be provided on the liquid-flow line. The gas-bubble generator may include an inlet port, an outlet port, and a turbulent flow path that may be configured to generate turbulence to cause the gas received from the gas supply to mix with a liquid stream flowing from the inlet port to the outlet port of the gas-bubble generator. The gas-bubble generator may be configured to receive the liquid via the inlet port and eject the liquid via the outlet port. The gas-bubble generator may be fluidically coupled to the gas supply and may further be configured to receive gas from the gas supply. The gas-bubble generator may further be configured to generate a plurality of gas-bubbles of the gas received from the gas supply and mix with the liquid stream flowing via the gas-bubble generator.

A method of enriching a liquid with gas-bubbles in a hydroponic system is provided in accordance with a configuration of the present disclosure. The method may include receiving the liquid at a gas-bubble generator from a first reservoir. The gas-bubble generator includes an inlet port and an outlet port. The gas-bubble generator is configured to receive the liquid via the inlet port and eject the liquid via the outlet port. The method may further include receiving a gas at the gas-bubble generator from a gas supply. The gas-bubble generator is fluidically coupled to the gas supply. The method may include generating, by the gas-bubble generator, a plurality of gas-bubbles of the gas received from the gas supply. The method may further include generating, by the gas-bubble generator, turbulence to cause the gas received from the gas supply to mix with the liquid flowing from the inlet port to the outlet port of the gas-bubble generator. Upon mixing of the plurality of gas-bubbles, the method may further include swirling and ejecting the liquid mixed with the plurality of gas-bubbles from the outlet port of the gas-bubble generator. The method may include receiving, at the first reservoir, the liquid mixed with the plurality of gas-bubbles from the gas-bubble generator. The first reservoir may include an inlet port, an outlet port, and a liquid-flow line fluidically coupled to the inlet port and the outlet port. The liquid mixed with the plurality of gas-bubbles is received at the first reservoir via the inlet port.

An apparatus for enriching a liquid with gas-bubbles in a hydroponic system is provided in accordance with a configuration of the present disclosure. The apparatus may include a reservoir that is configured to temporarily store the liquid. The reservoir may include an inlet port, an outlet port, and a liquid-flow line fluidically coupled to the inlet port and the outlet port. The liquid enters the reservoir via the inlet port and exits the reservoir via the outlet port. The apparatus may further include a pump positioned inside the reservoir and submerged in the liquid. The pump is configured to cause movement of the liquid along the liquid-flow line. The pump may include a suction port and a discharge port. The apparatus may further include a gas supply feeding a gas and a gas-bubble generator positioned inside the reservoir and provided on the liquid-flow line. The gas-bubble generator may include an inlet port, an outlet port, and a turbulent flow path configured to generate turbulence to cause the gas received from the gas supply to mix with a liquid stream flowing from the inlet port to the outlet port of the gas-bubble generator. The gas-bubble generator is configured to receive the liquid via the inlet port and eject the liquid via the outlet port. The gas-bubble generator may be fluidically coupled to the gas supply and may be configured to receive the gas from the gas supply. The gas-bubble generator may further be configured to generate a plurality of gas-bubbles of the gas received from the gas supply and mix with the liquid flowing via the gas-bubble generator.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

Figure 1:
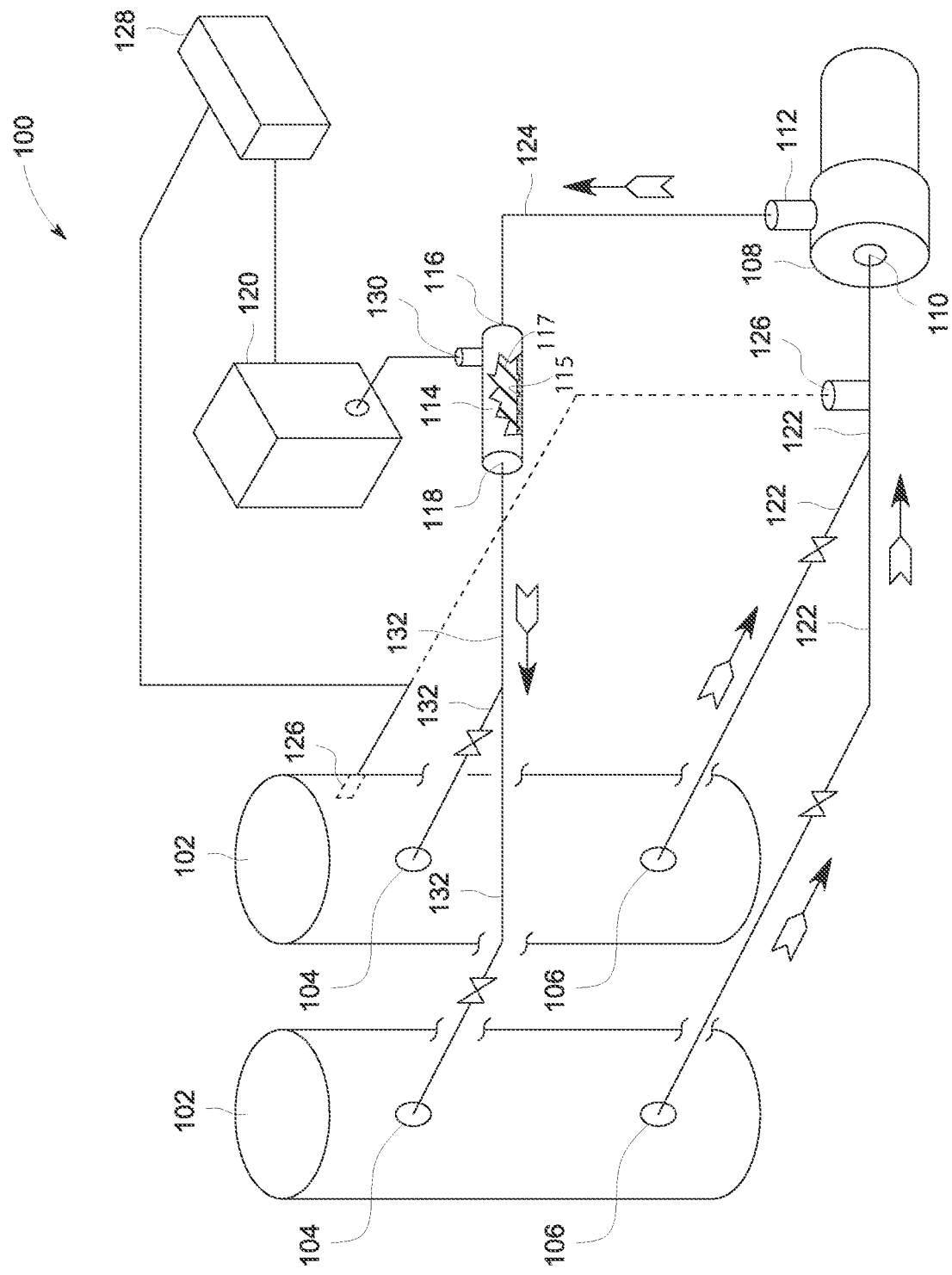
FIG. 1 illustrates a schematic diagram of a hydroponic system for enriching a liquid with gas bubbles, in accordance with one illustrative configuration of the present disclosure.

FIG. 1 is a schematic diagram of a hydroponic system 100 for enriching a liquid with gas-bubbles in accordance with one illustrative configuration of the present disclosure. The hydroponic system 100 may include at least one reservoir 102 configured to temporarily store the liquid. The at least one reservoir 102 may include any liquid storage facility as known in the industrial applications. For example, at least one reservoir 102 may include, but is not limited to a pipe, one or more pipes, a distribution manifold, an irrigation system, a tank, etc.

For ease of explanation, in the FIG. 1, the hydroponic system 100 is shown to include two reservoirs 102. However, it may be understood that the hydroponic system 100 may include any other number of reservoirs 102 as well. The at least one reservoir 102 may be manufactured from metal, plastic, or any other suitable material. It may be further noted that the at least one reservoir 102 may have a shape of a cylinder, a cube, a cuboid, etc.

In some configurations, each of the at least one reservoir 102 may include an inlet port 104 and an outlet port 106. The liquid may enter inside a reservoir of the at least one reservoir 102 via the inlet port 104. The liquid may exit a reservoir of the at least one reservoir 102 via the outlet port 106.

In some configurations, the inlet port 104 and the outlet port 106 of each of the at least one reservoir 102 may be fluidically coupled via a liquid-flow line. In other words, the liquid may be made to flow out of a reservoir of the at least one reservoir 102 via the outlet port 106. Further, upon circulating across the liquid-flow line (i.e., upon completion of a cycle), the liquid may be made to return to the reservoir of the at least one reservoir 102 via the inlet port 104. By way of an example, the inlet port 104 and the outlet port 106 may include an opening. Further, the inlet port 104 and the outlet port 106 may include a coupling member for allowing a liquid-flow line to be coupled to the at least one reservoir 102. By way of an example, the liquid-flow line may include a pipeline.

In some configurations, the hydroponic system 100 may further include a pump 108. The pump 108 may range in power from 0.5 to 20 horsepower, or more specifically 1 to 10 hp, or thereabout. However, it may be understood that the hydroponic system 100 may include any other number of pumps 108 as well. The pump 108 may be configured to cause movement of the liquid along the liquid-flow line. In some configurations, the pump 108 may include a suction port 110 and a discharge port 112. It may be noted that the pump 108 may cause movement of the liquid by sucking in the liquid through the suction port 110 and pushing out the liquid through the discharge port 112. In some configurations, the pump 108 may be a centrifugal pump operating at low pressures, for example, pressure of 50 pounds per square inch (PSI) or less. Further, as shown in the FIG. 1, the pump 108 may be positioned outside the at least one reservoir 102. In some alternate configurations, the pump 108 may be positioned inside one of the at least one reservoir 102 and may thus be submerged in the liquid.

In some configurations, the liquid-flow line may include an inlet piping manifold 122. As shown in the FIG. 1, the inlet piping manifold 122 may include one or more pipelines leading to the suction port 110 of the pump 108. As such, the suction port 110 of the pump 108 may be coupled to the outlet port 106 of each of the at least one reservoir 102 via the inlet piping manifold 122.

In some configurations, the liquid-flow line may further include a discharge piping manifold 124. As shown in the FIG. 1, the discharge piping manifold 124 may include one or more pipelines connected to the discharge port 112 of the pump 108. As such, the discharge port 112 may be coupled to the inlet port 116 of the gas-bubble generator 114 via the discharge piping manifold 124.

In some configurations, the liquid-flow line may further include an outlet piping manifold 132. As shown in the FIG. 1, the outlet piping manifold 132 may include one or more pipelines connecting the gas-bubble generator 114 with the at least one reservoir 102. As such, the outlet port 118 associated with the gas-bubble generator 114 may be coupled to the inlet port 104 of the at least one reservoir 102 via the outlet piping manifold 132.

It may be noted that each of the inlet piping manifold 122, the discharge piping manifold 124, and the outlet piping manifold 132 may include a rigid pipeline (having a fixed shape). As such, such pipelines may be made of a metal, an alloy, a rigid plastic, or any other suitable material. Alternately, these pipelines may include a flexible hose, for example, made of rubber.

As shown in the FIG. 1, the hydroponic system 100 may include a single pump 108. However, when a higher flow rate (i.e., higher Gallons Per Minute (GPM)) is required, multiple pumps 108 may be used. Further, in such cases, these multiple pumps 108 may be connected together by the piping manifolds to form a single inlet and outlet. In other words, the inlet piping manifold 122 may include a single pipe dividing into multiple channel pipes, with each channel pipe connected to the suction port 110 of one of the multiple pumps 108. Similarly, the discharge piping manifold 124 may include multiple channel pipes connected to the outlet of each of the multiple pumps 108 and converging into a single pipe. In other words, the multiple pumps 108 may be connected in parallel.

It should be noted that the piping manifolds, i.e., the inlet piping manifold 122, the discharge piping manifold 124, and the outlet piping manifold 132, may be sized based on the desired liquid flow rate. For example, it may be desirable to maintain a flow rate between 8 feet per second to 20 feet per second. Further, in some scenarios, it may be desirable to maintain a flow rate between 12 feet per second to 16 feet per second.

In some configurations, the hydroponic system 100 may further include a gas supply 120. In some other configurations, the gas supply 120 may also be termed as the gas concentrator 120. The gas supply 120 may be configured to feed a gas to the liquid. For example, the gas may be Oxygen gas. In other examples, the gas may be Nitrogen, Carbon Dioxide, etc., or any other gas as well. As shown in the FIG. 1, in some configurations, the gas supply 120 may be positioned outside the at least one reservoir 102.

In some configurations, the gas supply 120 may be an Oxygen concentrator that may generate Oxygen by extracting Oxygen gas from the atmospheric air in real-time. The Oxygen concentrator may be capability of delivering 1 liter per minute up to 50 liters per minute of Oxygen. It may be noted that the hydroponic system 100 may require 1 Liter per minute to 50 liters per minute of gas, as per the requirement.

In some other configurations, the gas supply 120 may be a gas storage which may store the gas in concentrated form. For example, the gas supply 120 may include a gas cylinder with pressurized Oxygen gas. In certain scenarios when the requirement of gas is above 20 liters per minute, the gas may be supplied from a second source, like the pressurized Oxygen gas cylinder. However, the illustrated system provides concentrated oxygen via the concentrator. In an alternate configuration, the gas supply 120 may include a gas creation equipment. In another configuration, the gas supply 120 may be an oxygen concentrator that includes a sieve tube configured to remove nitrogen from air. In yet another alternate configuration, the gas supply 120 may include a remote gas creation facility, with local supply of stored gas(es).

For the gas supply 120 to feed the gas to the liquid, the hydroponic system 100 may further include the gas-bubble generator 114. The gas-bubble generator 114 may be fluidically coupled to the gas supply 120. For example, as shown in the FIG. 1, the gas-bubble generator 114 may be coupled with the gas supply 120 via a pipeline, to allow the gas-bubble generator 114 to receive the gas from the gas supply 120. This pipeline may include a rigid pipeline (having a fixed shape) connecting the gas-bubble generator 114 with the gas supply 120. Accordingly, this pipeline may be made of a metal, an alloy, a rigid plastic, or any other suitable material. Alternately, this pipeline may include a flexible hose, for example, made of rubber.

The gas-bubble generator 114 may be provided on the liquid-flow line. It may be noted that the gas-bubble generator 114 may be configured to generate a plurality of gas bubbles using concentrated gas fed by the gas supply 120. The gas-bubble generator 114 may be further configured to mix these gas bubbles with the liquid stream flowing via the gas-bubble generator 114.

The gas-bubble generator 114 may include an inlet port 116 and an outlet port 118. The gas-bubble generator 114 may receive the liquid from the inlet port 116. The gas-bubble generator 114, upon feeding the plurality of gas bubbles to the liquid stream flowing through the gas-bubble generator, may discharge the liquid through the outlet port 118. In other words, the liquid may pass through the gas-bubble generator 114, as the liquid is being circulated across the liquid-flow line.

It may be noted that the plurality of gas bubbles may have a mean diameter of 100 microns or less. In some example implementations, the mean diameter of the gas-bubbles may be 0.1 microns or less.

In some configurations, in order to feed the gas to the liquid passing through the gas-bubble generator 114, the gas-bubble generator 114 may include a gas injector port 130. The gas injector port 130 may be configured to selectively supply the gas from the gas supply 120 to the gas-bubble generator 114. The gas injector port 130 may include a coupling member to allow the pipeline (connecting the gas-bubble generator 114 with the gas supply 120) to be coupled with the gas-bubble generator 114.

In some configurations, the gases entering the gas injector port 130 of the gas-bubble generator 114 may be low pressure gases. For example, pressure may be 40 pounds per square (PSI) or less. Traditional bubble generation systems require very high pressures such as permeable membrane and/or ceramic tube that requires the gas to be injected at very high pressures before the bubbles are created. However, even though the bubbles are created, the traditional bubble generation systems often create bubbles that are too large and often separate out of the liquid solution (thereby limiting the concentration).

In some configurations, the gas-bubble generator 114 may further include a turbulent flow path. The turbulent flow path may be configured to generate turbulence to cause the gas received from the gas supply 120 to uniformly mix with the liquid stream flowing via the gas-bubble generator 114. In other words, the gas-bubble generator 114 may create a turbulent liquid flow to mix the bubbles into the liquid flow stream.

It may be noted that in one configuration, the turbulent flow path may include an inner profile along at least a portion of the gas-bubble generator 114. Owing to this inner profile, turbulence may be generated in the liquid stream, as the liquid stream passes through the inner profile of the turbulent flow path. By way of an example, the inner profile of the turbulent flow path may include a converging section which may cause change in flow rate of the liquid, to thereby generate turbulence. By way of another example, the inner profile of the turbulent flow path may include grooves (115, FIG. 1) in one or two directions, arranged in a diamond pattern. Such inner profile increases interior surface area, and as the liquid stream passes through this inner profile, turbulence is generated in the liquid stream. In another configuration, the turbulent flow path may include one or more turbulators (117, FIG. 1). For example, a turbulator may include a rigid body twisted into a spiral (117, FIG. 1), for example, a cork-screw twist (double helical). As it will be understood by those skilled in the art, one or more turbulators (117, FIG. 1) may increase the velocity of the liquid stream, thereby generating turbulence in the liquid stream.

Upon mixing of the plurality of gas-bubbles (of the gas received from the gas supply 120) with the liquid flowing via the gas-bubble generator 114, the liquid may be imparted a swirl. The liquid mixed with the plurality of gas-bubbles may then be ejected from the gas-bubble generator 114, via the outlet port 118.

Multiple cycles of liquid enrichment may be performed by recirculating the liquid through the gas-bubble generator 114. It may be noted that the level of dissolved gas (e.g., dissolved Oxygen) in the at least one reservoir 102 may depend on the number of cycles performed. It may further be noted that a cycle may correspond to a number of gallons of liquid running in the hydroponic system 100 at any given time.

In some configurations, the hydroponic system 100 may further include a gas concentration sensor 126. The gas concentration sensor 126 may be configured to detect a concentration of gas mixed in the liquid. By way of example, the gas concentration sensor 126 may be positioned inside the at least one reservoir 102. As such, the gas concentration sensor 126 may detect the concentration of gas in the liquid that is temporarily being stored in the at least one reservoir 102. By way of another example, as shown in the FIG. 1, the gas concentration sensor 126 may be positioned on the inlet piping manifold 122. As such, the gas concentration sensor 126 may be positioned near the inlet of the pump 108. It may be noted that the positioning of the gas concentration sensor 126 may not be limited only to inside of the at least one reservoir 102 or the inlet piping manifold 122, but the gas concentration sensor 126 may be positioned at any other locations in the hydroponic system 100 as well.

The gas concentration sensor 126 may be configured to detect the concentration of gas mixed in the liquid, at periodic intervals, i.e., for example, once every 15 minutes, etc. Alternately, the gas concentration sensor 126 may be operating fulltime. Alternately, the gas concentration may be detected manually via a portable dissolved oxygen "DO" meter to detect the concentration of gas mixed in the liquid, as per the user requirements.

The hydroponic system 100 may further include a gas concentration controller 128. In some configurations, as shown in the FIG. 1, the gas concentration controller 128 may be positioned outside the at least one reservoir 102. The gas concentration controller 128 may be communicatively coupled to the gas concentration sensor 126, the gas supply 120, and/or the pump 108. The gas concentration sensor 126, upon detecting the value of concentration of dissolved gas in the liquid, may transmit this value to the gas concentration controller 128. The gas concentration controller 128 may be configured to control the concentration of dissolved gas in the liquid, based on a detected concentration of gas mixed in the liquid (detected by the gas concentration sensor 126).

In order to control the concentration of dissolved gas in the liquid, in some configurations, the gas concentration controller 128 may be further coupled to the gas supply 120. Upon receiving the value of concentration of dissolved gas in the liquid from the gas concentration sensor 126, the gas concentration controller 128 may compare the value with a predetermined threshold value. Once the value of the concentration of gas mixed in the liquid (as detected by the gas concentration sensor 126) meets the predetermined threshold value, the gas concentration controller 128 may cause the gas supply 120 to stop feeding the gas to the gas-bubble generator 114. In some configurations, the pump 108 may also be stopped when the value of the concentration of gas mixed in the liquid meets the predetermined threshold value. As a result, the process of enriching the liquid with the gas bubbles may be stopped.

Similarly, when the value of the concentration of gas mixed in the liquid is below the predetermined threshold value, the gas concentration controller 128 may cause the gas supply 120 to start feeding the gas (when the gas supply 120 is not already feeding the gas) to the gas-bubble generator 114. Or, when the gas supply 120 was already feeding the gas, and when the value of the concentration of gas mixed in the liquid is below the predetermined threshold value, the gas concentration controller 128 may not take any action and may therefore let the gas supply 120 to continue feeding the gas to the gas-bubble generator 114. In one configuration, the gas concentration controller 128 may also control the supply of the gas to the gas-bubble generator 114 based on comparison of the value of concentration of dissolved gas in the liquid with the predetermined threshold value. If the value is much lower than the predetermined threshold value, the supply of gas may automatically be started and as the value nears the predetermined threshold value, the supply of gas may be stopped, when the value is equal to or above the predetermined threshold value.

To this end, the gas concentration controller 128 may include a microcontroller or any computing device capable of analyzing the value of gas concentration (as detected by the gas concentration sensor 126) and further triggering the gas supply 120 to stop, start, or continue feeding the gas to the gas-bubble generator 114. In some configurations, the gas concentration controller 128 may include a timer switch. The configuration may be illustrated as FIG. 1, FIG. 2, or an infinite number of alternatives that rely on the teachings of the disclosure. In a lower-cost configuration, this timer switch may allow a user to define a preset time period for which the gas supply 120 may feed the gas to the gas-bubble generator 114. Once the preset time period is over, the timer switch may cause the gas supply 120 to stop feeding the gas to the gas-bubble generator 114. In one configuration, the time switch may initiate a timer to determine a time duration of supply of the gas from the gas supply 120 to the gas-bubble generator 114. At every expiry of a predefined time interval (for example, 5 minutes), the time switch may match the time duration with the preset time period. Whenever the time duration matches or exceeds the preset time period, the supply of gas may be stopped. It is noted that a manual stop interface (e.g., a button) may be provided to override any operation—for example, an operator of the system may sense (e.g., via a handheld dissolved oxygen "DO" meter) that the requested/required concentration of gas-bubble has been achieved (e.g., by hand-held sensor) and manually stop the flow of gas to the gas-bubble generator 114 and/or flow through the gas-bubble generator 114.

Figure 2:
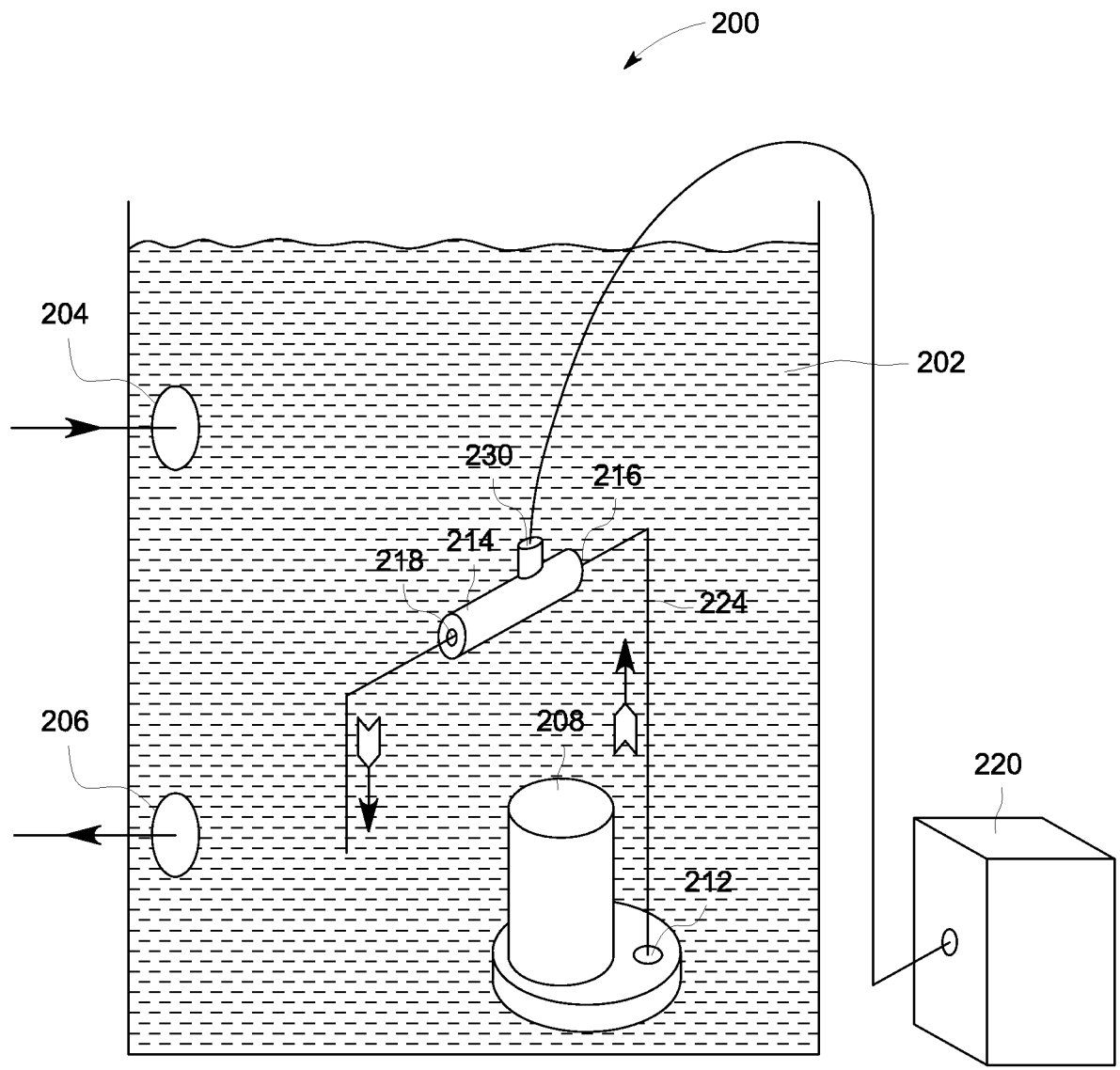
FIG. 2 illustrates a schematic diagram of an apparatus for enriching a liquid with gas bubbles, in accordance with one illustrative configuration of the present disclosure.

With reference to FIG. 2, a schematic diagram of an apparatus 200 for enriching a liquid with gas bubbles in a hydroponic system is illustrated, in accordance with one illustrative configuration of the present disclosure. The apparatus 200 may provide a more compact and a portable alternative to the hydroponic system 100.

The apparatus 200 may include a reservoir 202 that is configured to temporarily store the liquid. The reservoir 202 may be manufactured from metal, plastic, or any other suitable material. For example, the reservoir 202 may be made from steel. Further, the reservoir 202 may have a shape of, but is not limited to a cylinder, a cube, a cuboid, etc.

The reservoir 202 may include an inlet port 204 and an outlet port 206. The liquid may enter inside the reservoir 202 via the inlet port 204, and may exit the reservoir 202 via the outlet port 206. The liquid which is to be enriched with a gas may enter the reservoir 202 of the apparatus 200 through any opening (e.g. the inlet port 204, a different port, an open top to the reservoir 202, etc.). This liquid may then be enriched with the desired gas inside the reservoir 202, and once the desired concentration of gas in the liquid is achieved, the gas-enriched liquid may exit the reservoir 202 through the outlet port 206. By way of an example, each of the inlet port 204 and the outlet port 206 may include an opening. Further, each of the inlet port 204 and the outlet port 206 may include a coupling member that may allow a liquid-flow line to be coupled to the reservoir 202. It may be understood that the liquid-flow line may be used to guide the gas-enriched liquid to the area of application, for example, an aquaponics farm.

In some configurations, the apparatus 200 may further include a pump 208. The pump 208 may range in power from 0.25 hp to 10 hp, more specifically 0.5 to 5 horsepower or thereabout. The pump 208 may include a suction port (not shown in the FIG. 2) and a discharge port 212. By way of an example, the pump 208 may be positioned on the base of the reservoir 202 and may thus be submerged in the liquid within the reservoir 202. Further, the suction port of the pump 208 may be in the form of an opening located under the base of the pump 208. The pump 208 may cause movement of the liquid by sucking in the liquid through the suction port and pushing out the liquid through the discharge port 212. In some configurations, the pump 208 may be a centrifugal pump.

In some configurations, the apparatus 200 may include a discharge piping manifold 224. As shown in the FIG. 2, the discharge piping manifold 224 may include one or more pipelines leading to the discharge port 212 of the pump 208. As such, the discharge port 212 may be coupled to the inlet port 216 of the gas-bubble generator 214 via the discharge piping manifold 224.

The apparatus 200 may be coupled to a gas supply 220. The gas supply 220 may be configured to feed a gas, such as Oxygen gas to the liquid. As shown in the FIG. 2, the gas supply 220 may be positioned outside the reservoir 202. As explained in conjunction with FIG. 1, the gas supply 220 may generate the gas. For example, the gas supply 220 may generate Oxygen gas by processing the environment air and separating the Oxygen gas from the environment air. In some other configurations, the gas supply 220 may be a gas storage, e.g., a gas cylinder which may store the gas.

In order for the gas supply 220 to feed the gas to the liquid, the apparatus 200 may further include a gas-bubble generator 214. As shown in the FIG. 2, the gas-bubble generator 214 may be positioned inside the reservoir 202. The gas-bubble generator 214 may be fluidically coupled to the gas supply 220, via a pipeline, to allow the gas-bubble generator 214 to receive the gas from the gas supply 220. This pipeline may include a rigid pipeline (having a fixed shape) connecting the gas-bubble generator 214 with the gas supply 220. As such, this pipeline may be made of a metal, an alloy, a rigid plastic, or any other suitable material. Alternately, this pipeline may include a flexible hose, for example, made of rubber.

The gas-bubble generator 214 may be configured to generate a plurality of gas bubbles using the gas that is being fed by the gas supply 220. Further, the gas-bubble generator 214 may be configured to mix the gas bubbles with the liquid stream flowing via the gas-bubble generator 214. The gas-bubble generator 214 may include an inlet port 216 and an outlet port 218. The gas-bubble generator 214 may receive the liquid (to be enriched) from the inlet port 216 and may discharge the liquid (which has been enriched) via the outlet port 218. The plurality of gas bubbles may have a mean diameter of 100 microns or less.

In some configurations, in order to feed the gas to the liquid passing through the gas-bubble generator 214, the gas-bubble generator 214 may include a gas injector port 230. The gas injector port 230 may be configured to selectively supply the gas from the gas supply 220 to the gas-bubble generator 214.

In some configurations, the gas-bubble generator 214 may further include a turbulent flow path. The turbulent flow path may be configured to generate turbulence to cause the gas received from the gas supply 220 to mix with the liquid stream flowing via the gas-bubble generator 214. The turbulent flow path is already explained in detail in conjunction with FIG. 1. Upon mixing of the gas-bubbles (of the gas received from the gas supply 220) with the liquid flowing via the gas-bubble generator 214, the gas-mixed liquid may be imparted a swirl. The liquid mixed with the gas-bubbles may then be ejected from the gas-bubble generator 214 via the outlet port 218.

The apparatus 200 may further include a gas concentration sensor (not shown in FIG. 2 but similar to the gas concentration sensor 126 shown in FIG. 1) which may be configured to detect a concentration of gas mixed in the liquid. The gas concentration sensor may be positioned in the reservoir 202. As such, the gas concentration sensor may detect the concentration of the gas in the liquid that is temporarily being stored in the reservoir 202. The gas concentration sensor may be configured to detect the concentration of gas mixed in the liquid. Alternatively, or additionally, the gas concentration may be manually detected with a dissolved oxygen "DO" meter to detect the concentration of gas mixed in the liquid, as per the user requirement.

The apparatus 200 may further include a gas concentration controller (not shown in FIG. 2). The gas concentration controller may be communicatively coupled to the gas concentration sensor. The gas concentration sensor, upon detecting the value of concentration of dissolved gas in the liquid, may transmit this value (or, more likely a signal representative of the value) to the gas concentration controller. The gas concentration controller may be positioned outside the reservoir 202. The gas concentration controller may control the concentration of dissolved gas in the liquid, based on a detected concentration of gas mixed in the liquid (detected by the gas concentration sensor). This is already explained in conjunction with FIG. 1. Alternatively, the gas concentrator controller may be a manual interface (e.g. a switch) that controls the pump 208 and/or flow of oxygen to the gas injector port 230.

Figure 3:
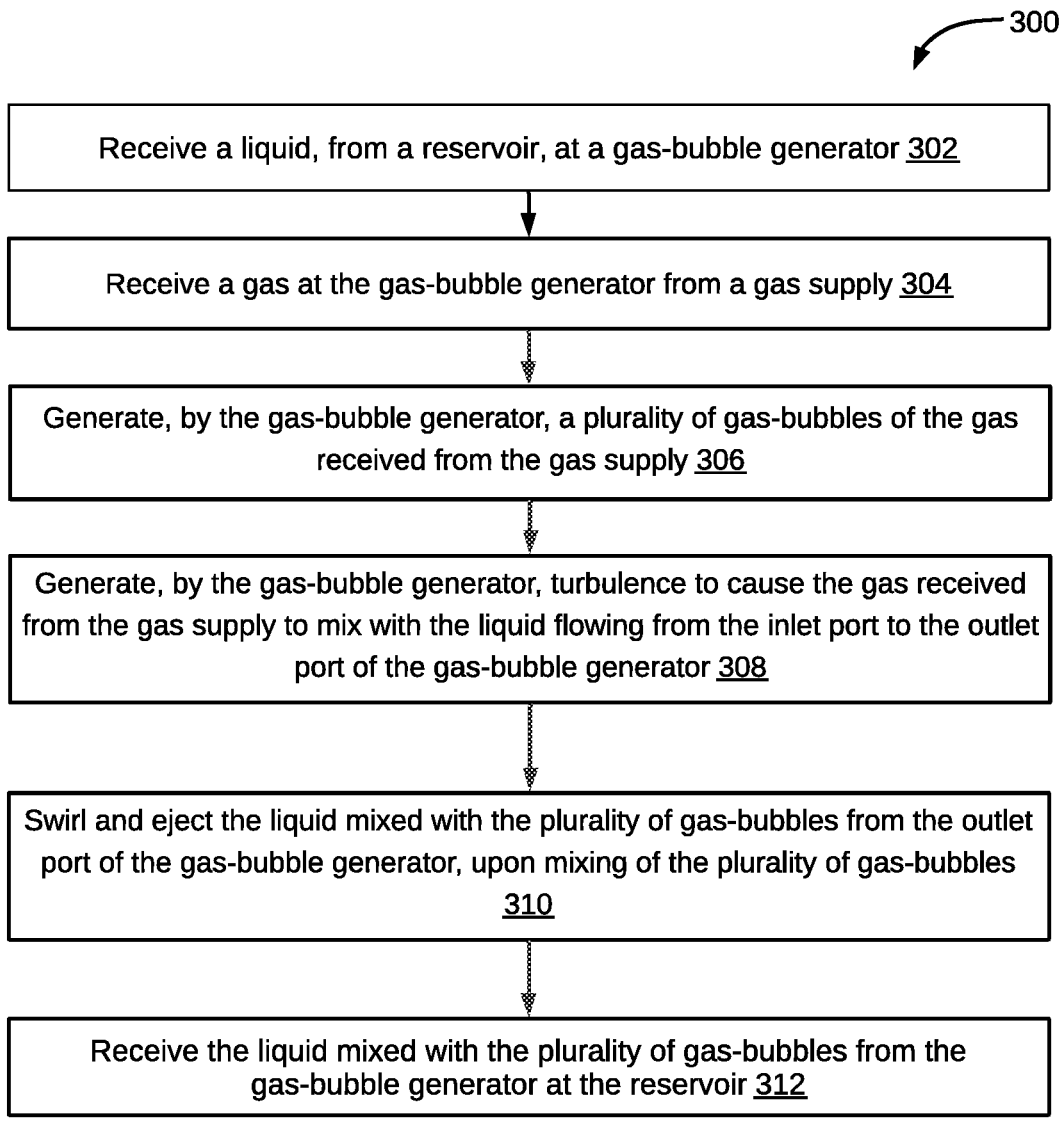
FIG. 3 is flowchart of a method of enriching a liquid with gas bubbles in a hydroponic system, in accordance with one configuration of the present disclosure.

With reference to FIG. 3, a flowchart of a method 300 of enriching a liquid with gas-bubbles in a hydroponic system is illustrated, in accordance with a configuration of the present disclosure. The method 300 may be performed for the purpose of aquaponics farming. The hydroponic system, for example, may be the hydroponic system 100. In an alternate configuration, the hydroponic system may be replaced by the apparatus 200.

The method 300 is being explained while referring to FIG. 1. It will however be apparent that such explanation is for the ease of explanation and is not limiting. At step 302, the liquid, for example, water, may be received at the gas-bubble generator 114 from the at least one reservoir 102. As already explained in conjunction with FIG. 1, the at least one reservoir 102 may be configured to temporarily store the liquid. Each of the at least one reservoir 102 may include the inlet port 104 and the outlet port 106. The liquid may enter inside one of the at least one reservoir 102 via the inlet port 104, and exit via the outlet port 106. The pump 108 may cause movement of the liquid across the gas-bubble generator 114. The pump 108 may include the suction port 110 and the discharge port 112. Further, the gas-bubble generator 114 may include the inlet port 116 and the outlet port 118. The gas-bubble generator 114 may be configured to receive the liquid via the inlet port 116 and eject the liquid via the outlet port 118.

At step 304, a gas may be received at the gas-bubble generator 114 from the gas supply 120. The gas supply 120 may be fluidically coupled to the gas-bubble generator 114 and may selectively supply the gas to the gas-bubble generator 114 via the gas injector port 230. At step 306, a plurality of gas-bubbles may be generated by the gas-bubble generator 114 of the gas received from the gas supply 120. The gas bubbles may have a mean diameter of 100 microns or less. At step 308, turbulence may be generated by the gas-bubble generator 114 to cause the gas received from the gas supply 120 to mix with the liquid flowing from the inlet port 116 to the outlet port 118 of the gas-bubble generator 114.

Upon mixing of the plurality of gas-bubbles, at step 310, the liquid mixed with the plurality of gas-bubbles may be swirled and subsequently ejected from the gas-bubble generator 114. At step 312, the liquid mixed with the plurality of gas-bubbles may be received from the gas-bubble generator 114 at the at least one reservoir 102 and may then be stored in the at least one reservoir 102. Thereafter, the gas-enriched liquid may be supplied from the at least one reservoir 102 at the application area, for example, an aquaponics farm.

Additionally, in some configurations, the concentration of gas mixed in the liquid may be detected in real-time, using the gas concentration sensor 126. The gas concentration sensor 126 may be positioned inside the at least one reservoir 102. Further, in some configurations, the concentration of gas mixed in the liquid may be controlled, using the gas concentration controller 128, based on the detected concentration of gas mixed in the liquid. This has already been explained in conjunction with FIG. 1.

Figure 4:
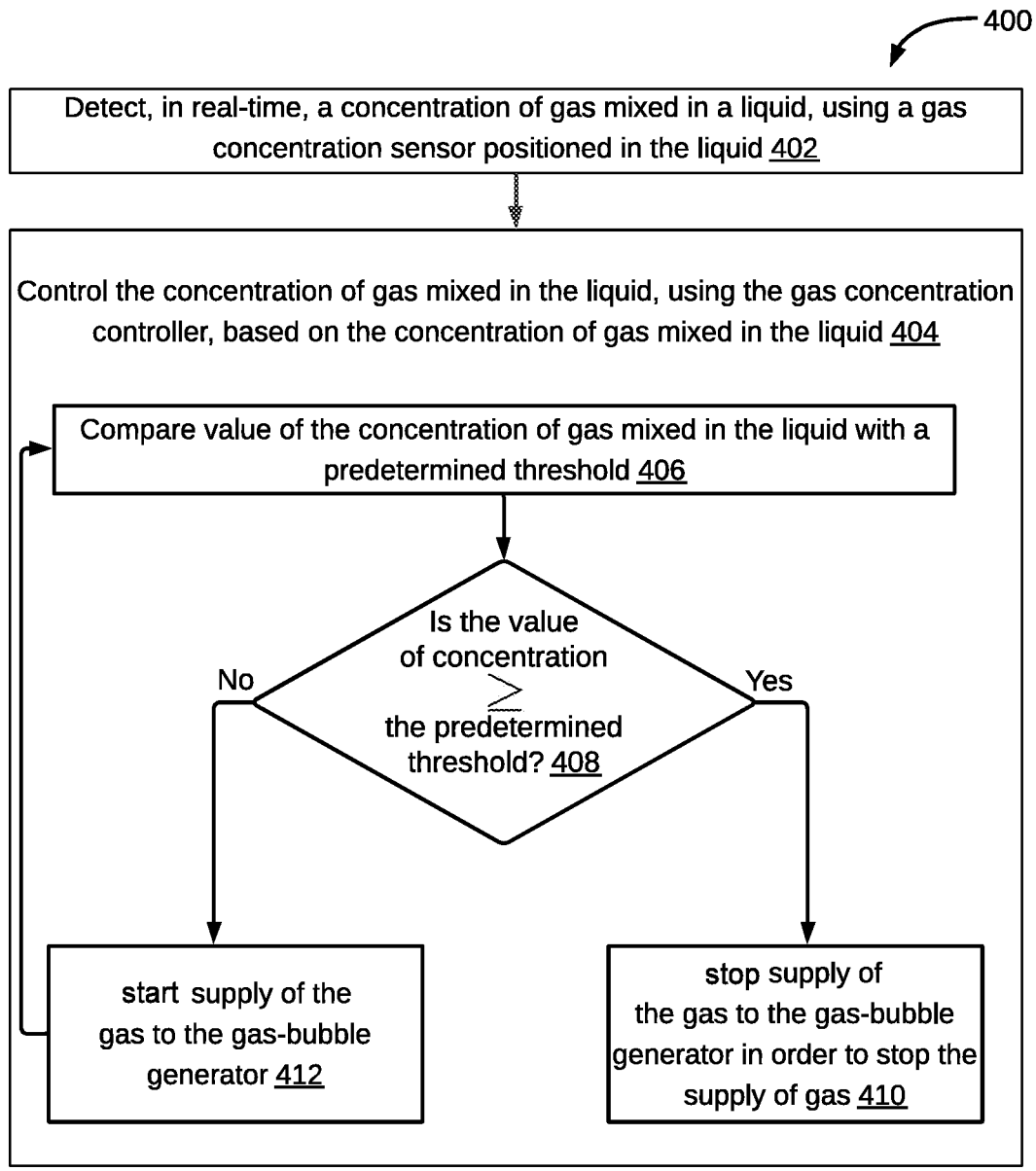
FIG. 4 is flowchart of a method for controlling concentration of gas mixed in a liquid based on a predetermined threshold of gas concentration, in accordance with one configuration of the present disclosure.

With reference to FIG. 4, a flowchart of a method 400 for controlling concentration of gas mixed in a liquid based on comparison of value of concentration of gas mixed in the liquid with a predetermined threshold of gas concentration is illustrated, in accordance with one configuration of the present disclosure.

The method 400 is being explained while referring to FIG. 1. It will however be apparent that such explanation is for the ease of explanation and is not limiting. At step 402, the gas concentration sensor 126, in real-time, may detect a concentration of gas mixed in the liquid. In one configuration, the gas concentration sensor 126 may be positioned in the liquid. Based on the concentration of gas mixed in the liquid (as determined at step 402), the gas concentration controller 128, at step 404, may control the concentration of gas mixed in the liquid. In the current configuration, in order to control the concentration of gas mixed in the liquid, the step 404 may further include steps 406 to step 412.

At step 406, the gas concentration controller 128 may compare value of the concentration of gas mixed in the liquid with a predetermined threshold. The predetermined threshold may correspond to the maximum amount of gas concentration in the liquid that is desirable or acceptable for a certain end application (for example, aquaponic farming). Thus, the value of the predetermined threshold may be varied in the gas concentration controller 128 based on the end application. In some configurations, the gas concentration controller 128 may auto adjust the value of the predetermined threshold based on the end application. To this end, a mapping of various end applications and corresponding predetermined thresholds may be stored or configured in the gas concentration controller 128.

At step 408, a check may be performed to determine whether the value of concentration of gas mixed in the liquid is greater than or equal to the predetermined threshold. If the value of concentration of gas mixed in the liquid is greater than or equal to the predetermined threshold, the gas concentration controller 128, at step 410, may send a signal to the gas supply 120 to stop the supply of gas to the gas-bubble generator 114.

Referring to step 408, if the value of concentration of gas mixed in the liquid is less than the predetermined threshold, the gas concentration controller 128, at step 412, may send a signal to the gas supply 120 to start (or alternatively increase rate of supply) the supply of gas to the gas-bubble generator 114.

Figure 5:
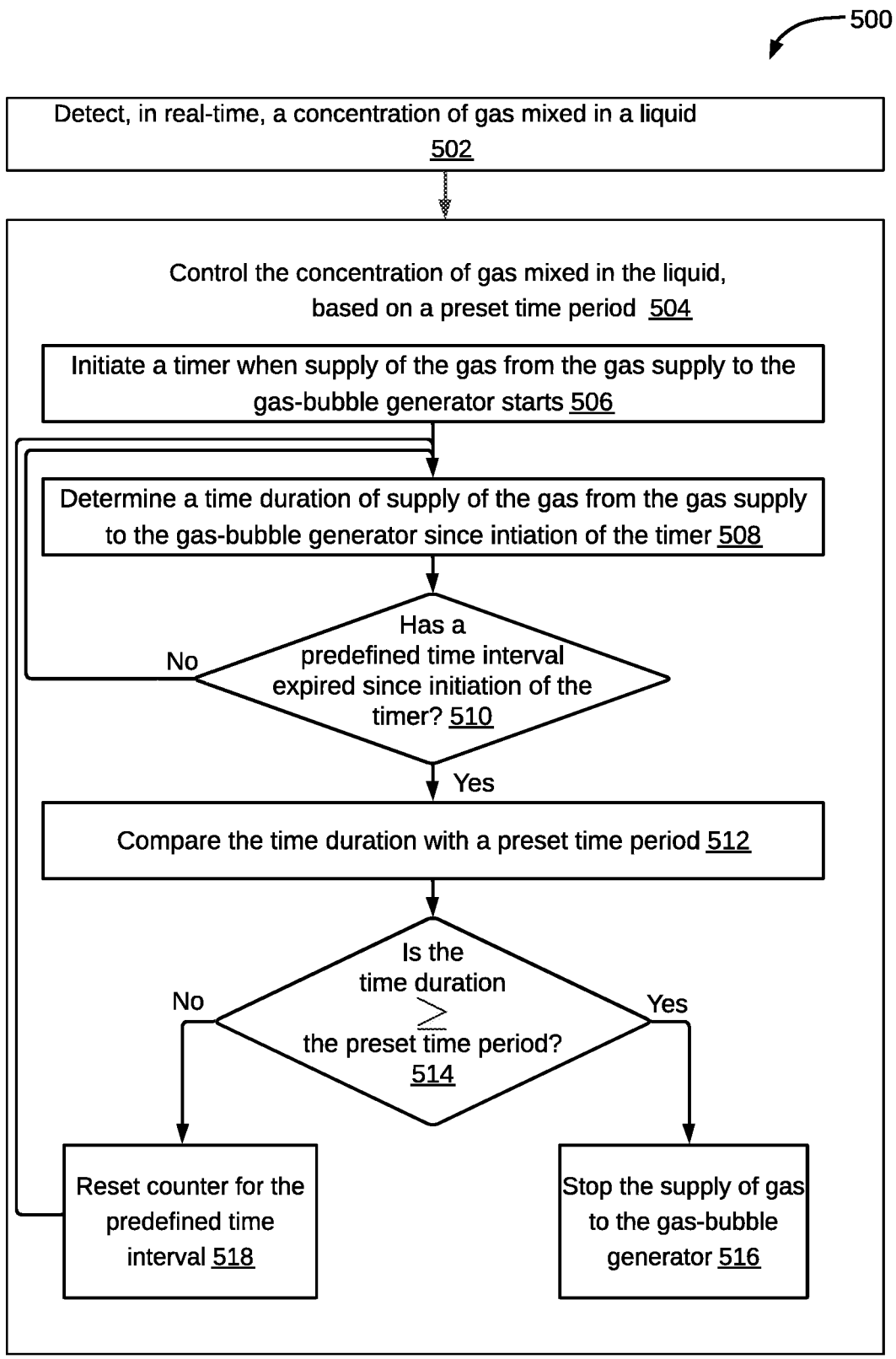
FIG. 5 is flowchart of a method for controlling concentration of gas mixed in a liquid based on comparison of a time period of supply of gas with a preset time period, in accordance with one configuration of the present disclosure.

With reference to FIG. 5, a flowchart of a method 500 for controlling concentration of gas mixed in a liquid based on comparison of a time period of supply of gas with a preset time period is illustrated, in accordance with one configuration of the present disclosure.

The method 500 is being explained while referring to FIG. 2. It will however be apparent that such explanation is for the ease of explanation and is not limiting. At step 502, the gas concentration sensor 126, in real-time, may detect a gas mixed in the liquid. At step 504, the gas concentration controller 128 may control the concentration of gas mixed in the liquid by supplying gas on the preset time period. In the current configuration, in order to control the concentration of gas mixed in the liquid, the step 504 may further include steps 506 to step 518.

At step 506, the gas concentration controller 128 (which may be as simple as a mechanical timer, for example) may initiate a timer when supply of the gas from the gas supply 120 to the gas-bubble generator 114 is started. It will be apparent that the gas concentration controller 128 may include the timer, which for example, may be an internal clock of the gas concentration controller 128. After the timer is initiated, the gas concentration controller 128, at step 508, may determine a time duration of supply of the gas from the gas supply 120 to the gas-bubble generator 114. At step 510, the gas concentration controller 128 may perform a check to determine whether a predefined time interval has expired since initiation of the timer. It may further be noted that the secondary internal clock may be different from the internal clock linked to the timer. If the predefined time interval has not expired, the control may move back to step 508.

Referring to step 510, if the predefined time interval has expired, the gas concentration controller 128, at step 512, may compare the time duration (determined at step 508) with the preset time period. In one configuration, the preset time period may be varied in the gas concentration controller 128 based on the end application. In another configuration, the gas concentration controller 128 may auto adjust value of the preset time period based on the end application. To this end, a mapping of various end applications and corresponding preset time period may be stored or configured in the gas concentration controller 128.

At step 514, the gas concentration controller 128 may perform a check to determine whether the time duration (as determined at step 508) is greater than or equal to the pre-set time period. If the time duration is greater than or equal to the pre-set time period, the gas concentration controller 128, at step 516, may send a signal to the gas supply 120 and/or the gas injector port 130 to stop the supply of gas to the gas-bubble generator 114. However, if the time duration is less than the pre-set time period, the gas concentration controller 128, at step 518, may reset counter for the predefined time interval. In other words, the secondary internal clock that may be used to determine and track the predefined time interval may be reset to zero. Thereafter, the control may move back to step 508.

In one configuration, the method 500 may be replaced by a manual process of activating a switch that simultaneously controls the flow of gas from the gas supply 220 to the gas injector port 130, operation of the gas supply 220, and/or the operation of the pump 280.

One or more techniques of enriching a liquid with gas-bubbles are disclosed above. The above-disclosed techniques provide for a capability of delivering a liquid mixed with gas-bubbles to the capacity of 20 gallons per minute to 1,000 gallons per minute. The techniques allow for using one or multiple pumps for achieving the above-mentioned flow rates. Further, the techniques allow using different gases, for example, air, Oxygen, Nitrogen, Carbon Dioxide, etc. for enriching the liquid. The techniques further provide for measuring the level of dissolved Oxygen (DO) in the liquid flowing in the system, using the gas concentration sensor. Further, the level of the dissolved Oxygen in the system may be controlled using the gas concentration controller. The techniques further provide for automating the process of controlling the concentration of gas mixed in the liquid, using the gas concentration sensor and the gas concentration controller. The techniques provide a versatile solution for use in various different applications, like agriculture (e.g., plant root enrichment), water treatment, and wastewater treatment. Further, by using the Oxygen gas bubbles having mean diameter (less than 100 microns), the automatic loss of Oxygen gas from the liquid is reduced. It may be noted that the gas bubbles of the order of 0.1 microns are not buoyant in the liquid and can remain in suspension, only losing two parts per million (PPM) or less in a 24-hour period, when the dissolved oxygen level is between 30 to 40 PPM. This allows the liquid to retain the dissolved Oxygen for a longer duration, and hence reduces the number of enrichments cycles required, thereby making the system more efficient. Further, the techniques allow for performing a number of cycles of liquid enrichment by recirculating the liquid through the gas-bubble generator. Furthermore, the system and apparatus disclosed above are capable of operating at low pressure of gas-source, thereby reducing cost and increasing safety. Moreover, the above disclosed system and apparatus provide a complete self-contained solution of enriching a liquid with gas.

Figure 6:
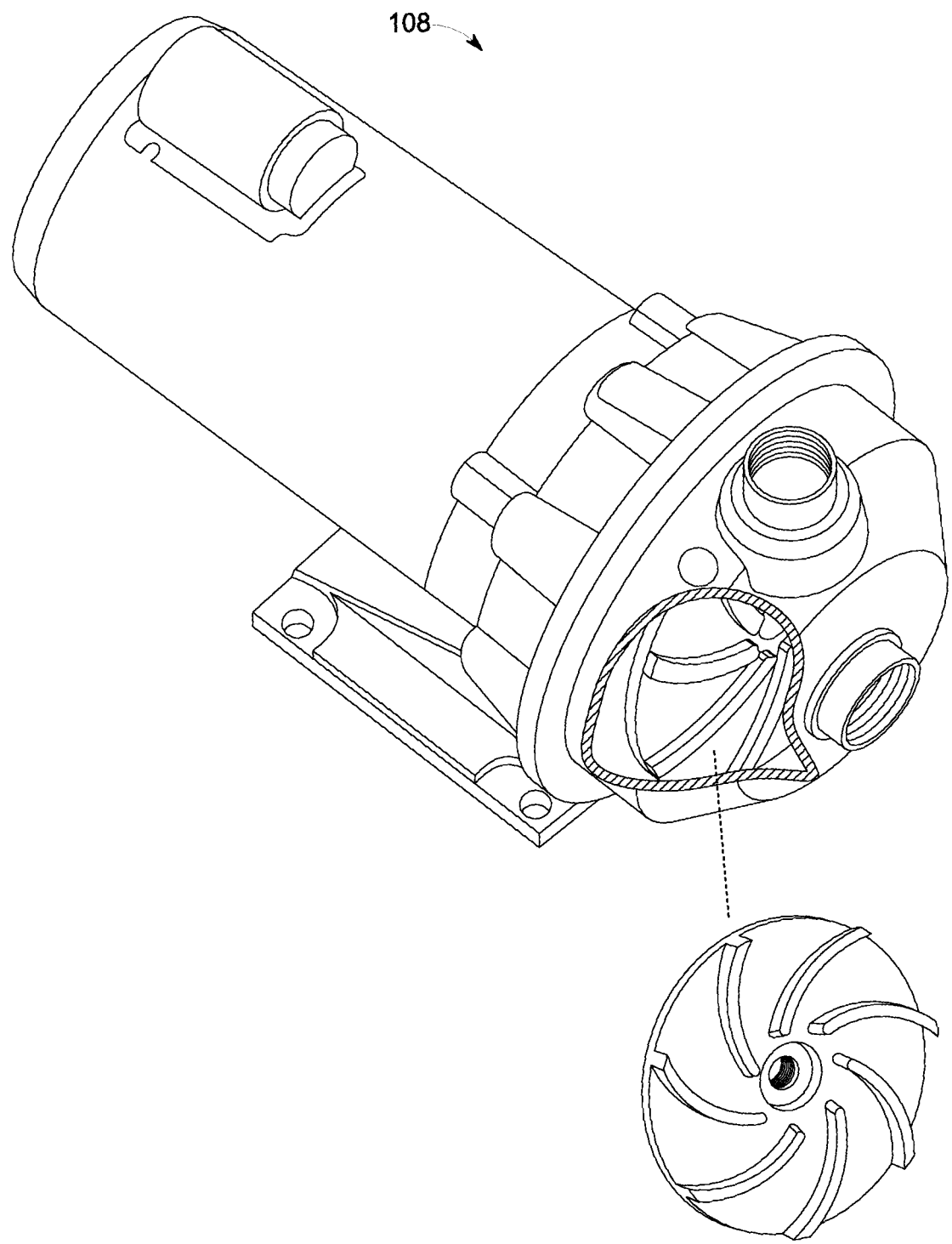
FIG. 6 illustrates a perspective view of one configuration of a pump, specifically a centrifugal-type pump having an impeller shown in a cut-away section.

Referring now to FIG. 6, a perspective view 600 of one configuration of the pump 108, specifically a centrifugal-type pump having an impeller shown in a cut-away section, is illustrated. The hydroponic system 100 (FIG. 1) may be configured with the illustrated configuration of the pump 108 that includes an open impeller, may be all stainless steel end suction pump. In other configurations, the pump 108 may include a closed impeller or other style of pump common in industry. Examples of such pumps may include pumps in a range of ½ to 20 horsepower, or more to ½ to 5 horsepower. With these pumps, the suction and discharge diameters may range from ¾ inch to 8 inches, however smaller or larger suction/discharge diameters may be specified.

In one configuration, the hydroponic system 100 may include the gas-bubble generator 214 configured as a mixing apparatus for generating and mixing gas bubbles into a liquid. While many types of gas-bubble generators have been contemplated, reviewed, and/or tested, a gas-bubble generator incorporating a structure defining an interior fluid-flow chamber that extends along a longitudinal axis between an input port at a liquid input end and an output port at a liquid output end has proven useful. The structure includes a gas injection portion located upstream from the liquid output end and a mixing vane portion extending in the downstream direction from the gas injection portion. The gas injection portion defines a gas injection lumen and a first region of the interior fluid-flow chamber, while the mixing vane portion defines a second region of the interior fluid-flow chamber. This mixing apparatus may be manufactured in about ½ to 4 inch sizes for use in varying systems, where the size corresponds to the interior diameter of the apparatus at the liquid input end and the liquid output end. Testing of a ½ inch size ultra-fine bubble generating liquid/gas mixing apparatus configured as disclosed herein, has generated ultra-fine bubbles having a size –100 nanometers and concentration of 265,000,000 bubbles per ml, as measured using a particle analyzer.

Figure 7:
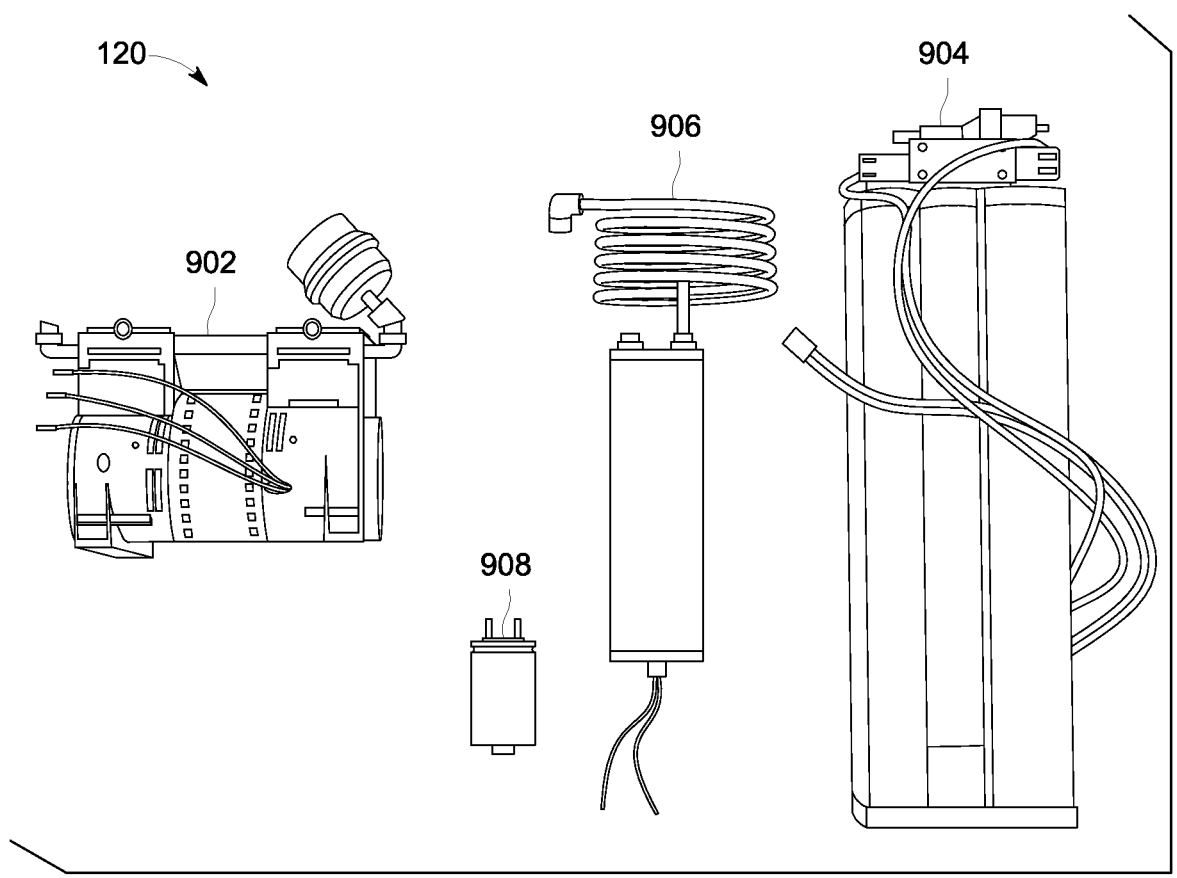
FIG. 7 illustrates components of one configuration of a gas supply, specifically configured as a gas concentrator.

In one configuration illustrated in FIG. 7, the hydroponic system 100 may be configured with the gas concentrator 120 (earlier referred to as the gas supply 120) that includes a compressor 902, a sieve module 904, moisture separator with heat exchanger 906 and a capacitor 908.

In one illustrative configuration, the sieve module 904 within the gas concentrator 120, the sieve module 904 may hold a molecular sieve, allowing for a location for gas exchange via adsorption/desorption. The sieve module 904 may further include two main aluminum sieve tubes, a product gas vent tube and an exhaust gas vent tube. It may be noted that the sieve module 904 may be manufactured to be a single, overall unit rather than several small, independent, and complexly designed units. The sieve module 904 may be installed and used by plugging it into two hoses (one of which is from the compressor 902 while the other is the product). Each of the product gas vent tube and the exhaust gas vent tube may be filled with a distinct blend of Sodium or Lithium-based molecular sieves (Sodium and Lithium Aluminosilicates). The ratio of the Sodium or Lithium-based molecular sieves may be fine-tuned and perfected to provide a sieve blend that performs perfectly in oxygen purification applications. Both the Sodium and Lithium-based molecular sieves have an extremely high affinity for Nitrogen, which allows for it to efficiently capture and release the gas, leaving behind only oxygen with traces of atmospheric, inert gases.

Figure 8:
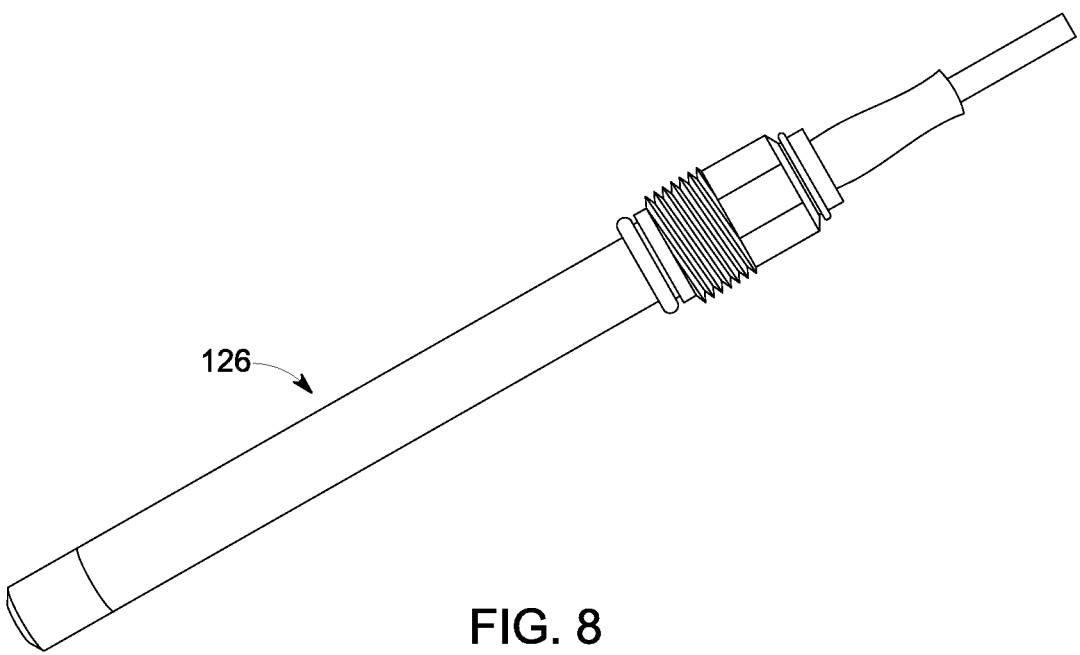
FIG. 8 illustrates one configuration of a gas concentration sensor.

In one configuration illustrated in FIG. 8, the hydroponic system 100 may include the gas concentration sensor 126 (of the hydroponic system 100, FIG. 1) to measure the level of dissolved oxygen, for example between 40 parts per billion (PPB) to 40 parts per million (PPM) of dissolved oxygen. This gas concentration sensor is an electrochemical oxygen sensor that uses a membrane and an electrolyte that are non-consumable. The response time is fast and it operates in the temperature range of 0 to 60 degrees Celsius.

Figure 9:
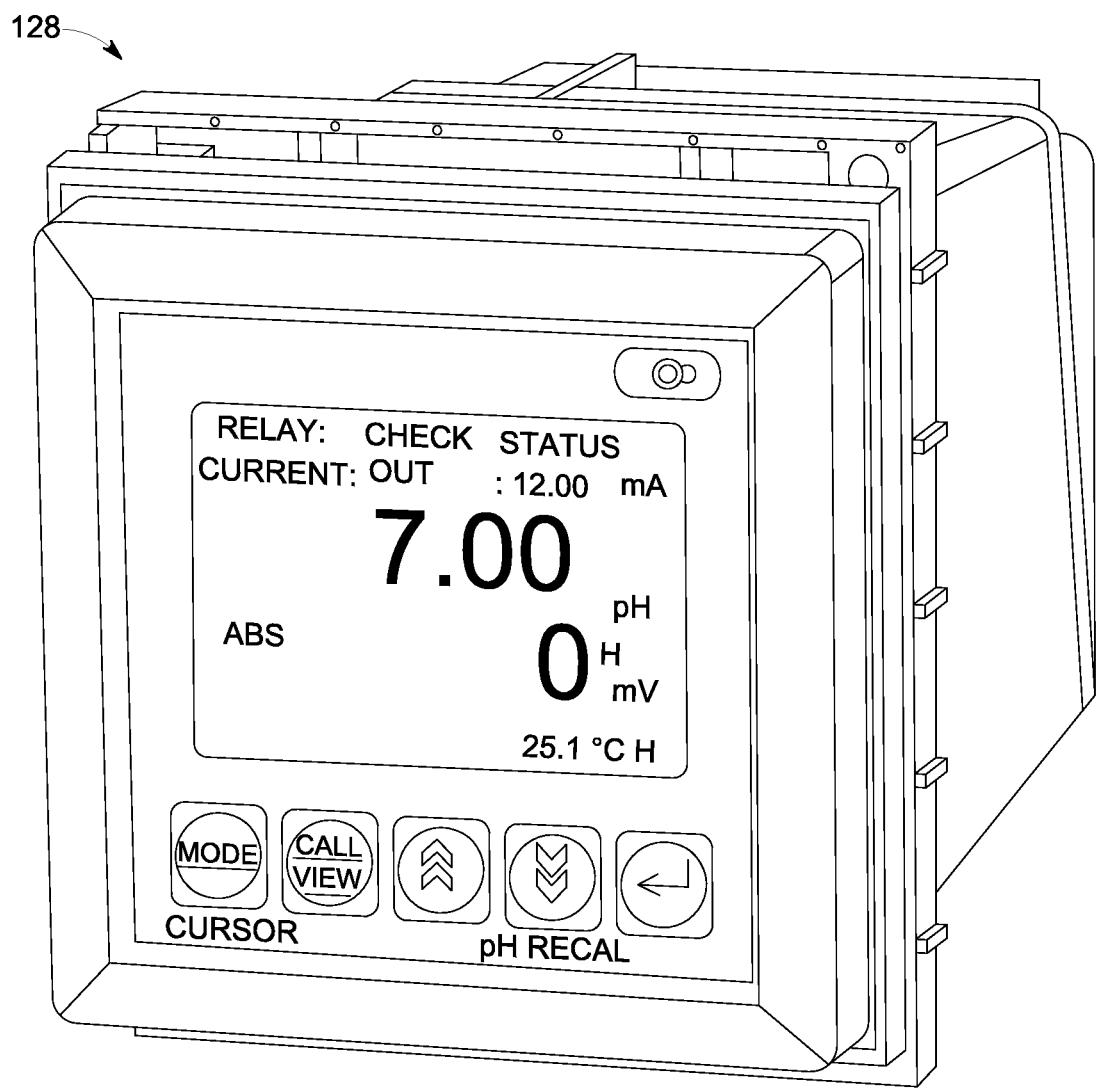
FIG. 9 illustrates one configuration of a gas concentration controller.

In one configuration in FIG. 9, the hydroponic system 100 (FIG. 1) may include the gas concentration controller 128 capable of interfacing with the gas concentration sensor 126 and ultimately generating instruction(s), signal(s), and/or connections to various components of the hydroponic system 100 (e.g., the pump 108 the gas supply 120 (or the gas concentrator, the gas-bubble generator 114, the gas concentration sensor 126 etc.). The gas concentration controller 128 controls the level of dissolved oxygen.

Figure 10:
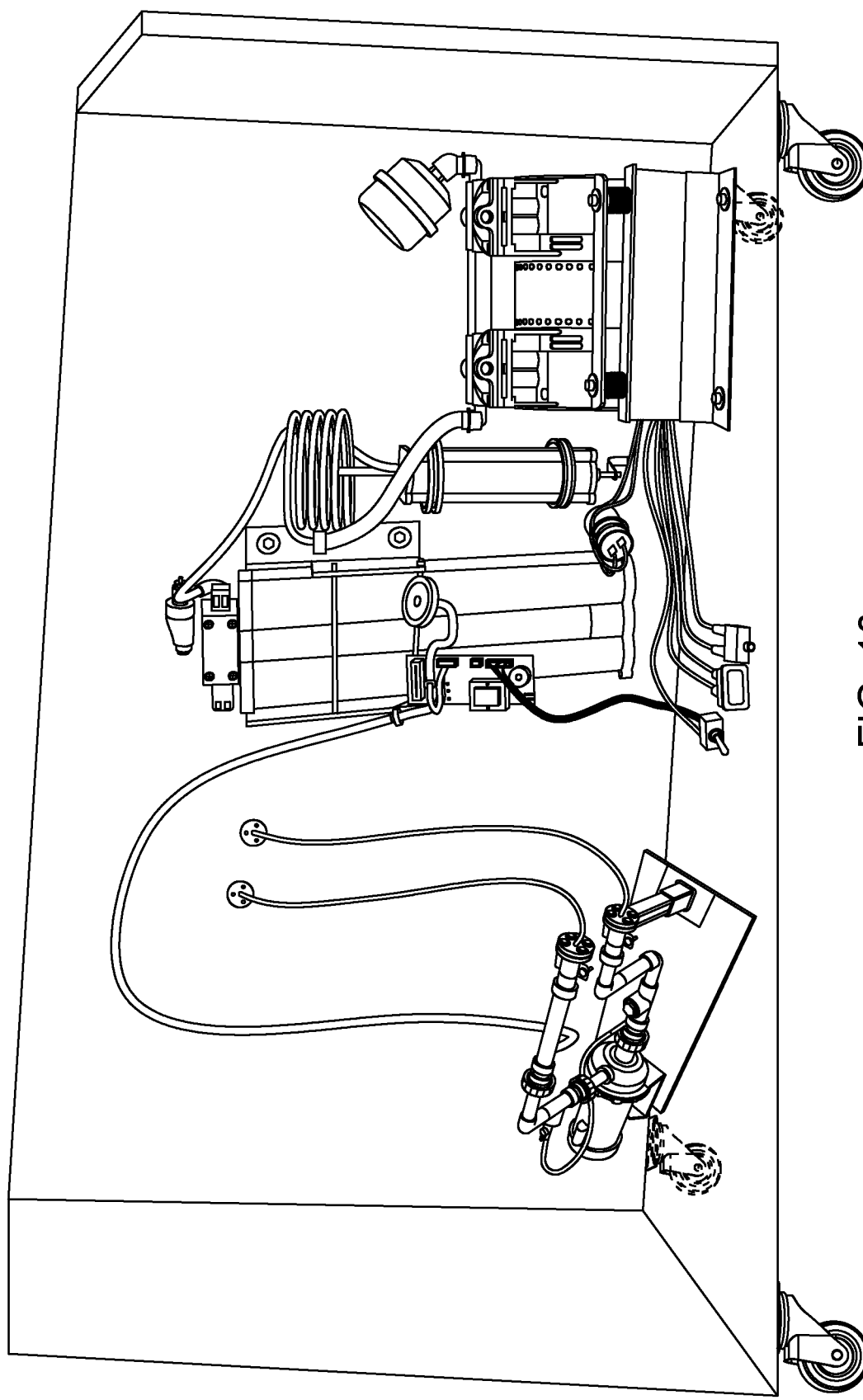
FIG. 10 illustrates one configuration of a hydroponic system self-contained in an enclosure.

In one configuration in FIG. 10, the hydroponic system 100 may be fully enclosed in a housing wherein the gas supply 120, the gas concentration sensor 126 (in the hydroponic system 100 or other systems, e.g. the tank), the gas concentration controller 128, the pump 108, the gas-bubble generator 114, the inlet piping manifold 122, and the discharge manifold 132 are collocated inside an enclosure to create a readily deployable hydroponic system that can be moved between production lines in a hydroponic facility, or to a remote facility if desired. This illustrative configuration may include the housing of about 2 feet×4 feet by 2½ feet (W×L×H), more specifically 28 inches×46 inches×28 inches. These dimensions do not include wheels (e.g., casters) attached to the bottom of the housing—for example 3 inch diameter casters attached each of the four corners of the housing.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

It is intended that the disclosure and examples be considered as exemplary only, with a true scope and spirit of disclosed configurations being indicated by the following claims and amendments made thereto in the original application, divisional applications, continuations application, and/or foreign applications.

What is claimed is:

1. A hydroponic system for enriching a liquid with gas-bubbles configured to improve plant health, the hydroponic system comprising:
   a first reservoir configured to temporarily store the liquid, the first reservoir comprising:
   a first reservoir inlet port;
   a first reservoir outlet port;
   a liquid-flow line fluidically coupled to the first reservoir inlet port and the first reservoir outlet port,
   wherein the liquid enters the first reservoir via the first reservoir inlet port; and
   wherein the liquid exits the first reservoir via the first reservoir outlet port;
   a pump configured to cause movement of the liquid across the pump, wherein the pump comprises:
   a suction port; and
   a discharge port;
   a gas supply feeding a pressurized gas;
   a gas-bubble generator provided on the liquid-flow line, the gas-bubble generator comprising:
   an inlet port;
   an outlet port;
   a gas injection port configured to selectively supply the pressurized gas from the gas supply to the gas-bubble generator; and a turbulent flow path inside the gas-bubble generator;
a rigid body formed in a spiral configured to create the turbulent flow path along which the pressurized gas is mixed with the liquid;
wherein the gas-bubble generator is configured to receive the liquid via the inlet port and eject the liquid via the outlet port;
wherein the gas-bubble generator is: fluidically coupled to the gas supply via the gas injection port and configured to receive the pressurized gas from the gas supply via the gas injection port;
wherein the gas-bubble generator is further configured to generate a plurality of gas-bubbles of the pressurized gas received from the gas supply and mix with a liquid stream flowing via the gas-bubble generator; and
wherein the liquid stream containing the plurality of gas-bubbles is in fluid communication with at least one plant.

2. The hydroponic system of claim 1, wherein the gas-bubble generator is configured to generate gas-bubbles comprising a mean diameter of 100 microns or less.

3. The hydroponic system of claim 1 further comprising:
a gas concentration sensor positioned in the liquid.

4. The hydroponic system of claim 3 further comprising:
a gas concentration controller communicatively coupled to the gas concentration sensor, the gas supply, and the pump; and
wherein the gas concentration controller is configured to control a concentration of dissolved gas in the liquid, the gas supply, and operation of the pump, based on a detected concentration of gas mixed in the liquid.

5. The hydroponic system of claim 1, wherein the pump is a centrifugal pump.

6. The hydroponic system of claim 5, wherein the pump comprises:
an impeller having a diameter of at least 3 inches.

7. The hydroponic system of claim 1, wherein the pump is positioned in the first reservoir and submerged in the liquid.

8. The hydroponic system of claim 1 and further comprising:
a housing configured to support the pump and the gas-bubble generator; and
a plurality of wheels attached to the housing.

9. The hydroponic system of claim 1 and further comprising:
a second reservoir comprising:
a second reservoir inlet port; and
a second reservoir outlet port;
an inlet piping manifold along the liquid-flow line; and
wherein the first reservoir inlet port and the second reservoir inlet port are selectively fluidically coupled to the outlet port of the gas-bubble generator via the inlet piping manifold.

10. The hydroponic system of claim 9, wherein the liquid-flow line further comprises:
a discharge piping manifold; and
wherein the first reservoir outlet port and the second reservoir outlet port are selectively fluidically coupled to the suction port of the pump via the discharge piping manifold.

11. The hydroponic system of claim 1, wherein the gas supply is an oxygen concentrator comprising:
a sieve tube configured to remove nitrogen from air.

12. The hydroponic system of claim 11, wherein the gas supply comprises:
medium in the sieve tube configured to react with nitrogen in the air to concentrate oxygen.

13. The hydroponic system of claim 12, wherein the medium comprises:
sodium or lithium configured to react with nitrogen in the air to concentrate oxygen.

14. The hydroponic system of claim 1, wherein the rigid body formed in the spiral comprises a turbulator.

15. The hydroponic system of claim 1 wherein the gas-bubble generator further comprises:
an inner profile formed inside the gas-bubble generator; and
a plurality of grooves formed on the inner profile.

16. An apparatus for enriching a liquid with gas-bubbles in a system, the apparatus comprising:
a reservoir configured to temporarily store the liquid, the reservoir comprising:
a reservoir inlet port;
a reservoir outlet port;
a liquid-flow line fluidically coupled to the reservoir inlet port and the reservoir outlet port;
wherein the liquid enters the reservoir via the reservoir inlet port; and
wherein the liquid exits the reservoir via the reservoir outlet port;
a pump positioned inside the reservoir and submerged in the liquid, wherein the pump is configured to cause movement of the liquid across the pump, the pump comprising:
a suction port; and
a discharge port;
a gas supply feeding a pressurized gas; and
a gas-bubble generator positioned inside the reservoir and provided on the liquid-flow line, the gas-bubble generator comprises:
an inlet port;
an outlet port;
an injection port; and
a turbulent flow path inside the gas-bubble generator
a rigid body formed in a spiral configured to create the turbulent flow path
along which the pressurized gas is mixed with the liquid;
wherein the turbulent flow path is configured to generate turbulence to cause the pressurized gas received from the gas supply to mix with a liquid stream flowing from the inlet port to the outlet port of the gas-bubble generator;
wherein the gas-bubble generator is configured to receive the liquid via the inlet port and eject the liquid via the outlet port;
wherein the gas-bubble generator is:
fluidically coupled to the gas supply; and
configured to receive the pressurized gas from the gas supply via the injection port; and
wherein the gas-bubble generator is further configured to generate a plurality of gas-bubbles of the pressurized gas received from the gas supply and mix with the liquid flowing via the gas-bubble generator; and
wherein the liquid stream containing the plurality of gas-bubbles is in fluid communication with at least one plant.

17. The apparatus of claim 16, wherein the gas supply is positioned outside the reservoir.

18. The apparatus of claim 16 and further comprising:
a timer outside of the reservoir.

19. The apparatus of claim 18 and further comprising:
a gas concentration controller communicatively coupled to the timer, the pump, and the gas supply;
wherein the gas concentration controller is configured to control a concentration of dissolved gas in the liquid, based on time of gas mixed in the liquid.

20. The apparatus of claim 19 further comprising:
a gas concentration sensor communicatively coupled to the gas concentration controller and configured to detect concentration of the pressurized gas dissolved in the liquid;
wherein the gas concentration sensor is positioned on an inlet piping manifold and near an inlet of the pump.

21. The apparatus of claim 16, wherein the pump is a centrifugal pump.

22. The apparatus of claim 21, wherein the pump comprises:
an impeller having a diameter of at least 3 inches.

23. The apparatus of claim 16, wherein the gas-bubble generator comprises:
a gas injector port configured to selectively supply the pressurized gas from the gas supply to the gas-bubble generator.

24. The apparatus of claim 16 and further comprising:
a discharge piping manifold; and
wherein the outlet port of the reservoir is selectively fluidically coupled to the suction port of the pump via the discharge piping manifold.

25. The apparatus of claim 16, wherein the rigid body formed in the spiral comprises a turbulator.

26. The apparatus of claim 16 wherein the gas-bubble generator further comprises:
an inner profile formed inside the gas-bubble generator; and
a plurality of grooves formed on the inner profile.

* * * * *